Aug. 26, 1958     G. P. BOSOMWORTH     2,849,059
BEAD SEATING AND INFLATING DEVICE FOR TUBELESS TIRE
Filed July 21, 1955     2 Sheets-Sheet 1
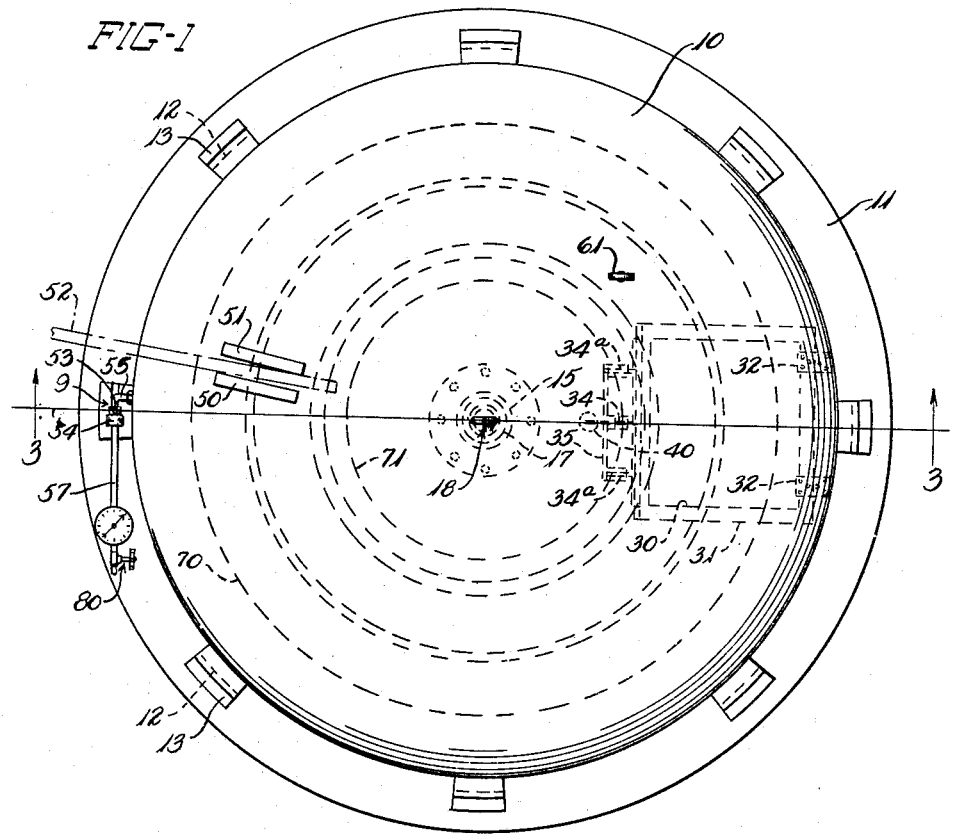
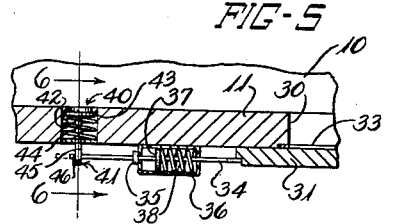
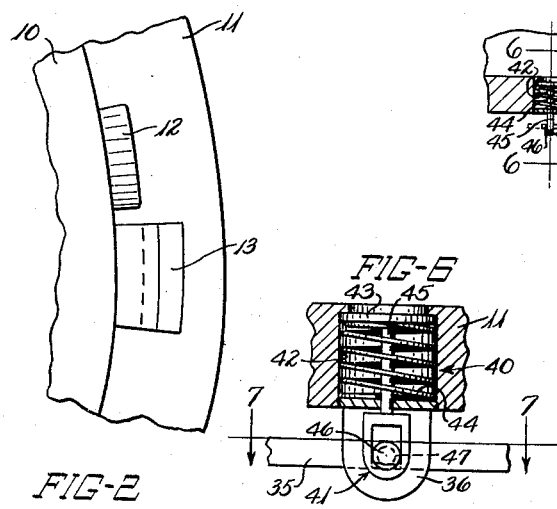
INVENTOR.
GEORGE P. BOSOMWORTH
BY
W. A. Fraser
ATTY.

Aug. 26, 1958 G. P. BOSOMWORTH 2,849,059
BEAD SEATING AND INFLATING DEVICE FOR TUBELESS TIRE
Filed July 21, 1955 2 Sheets-Sheet 2
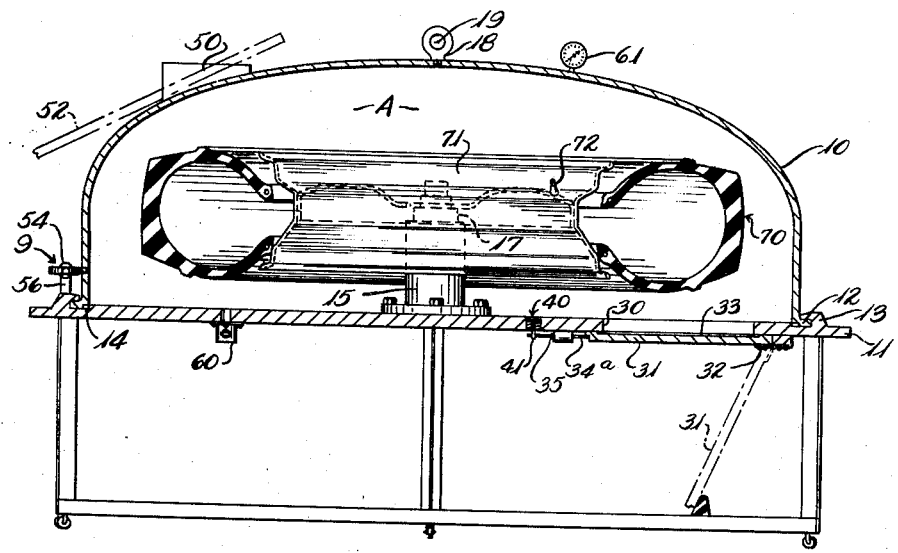
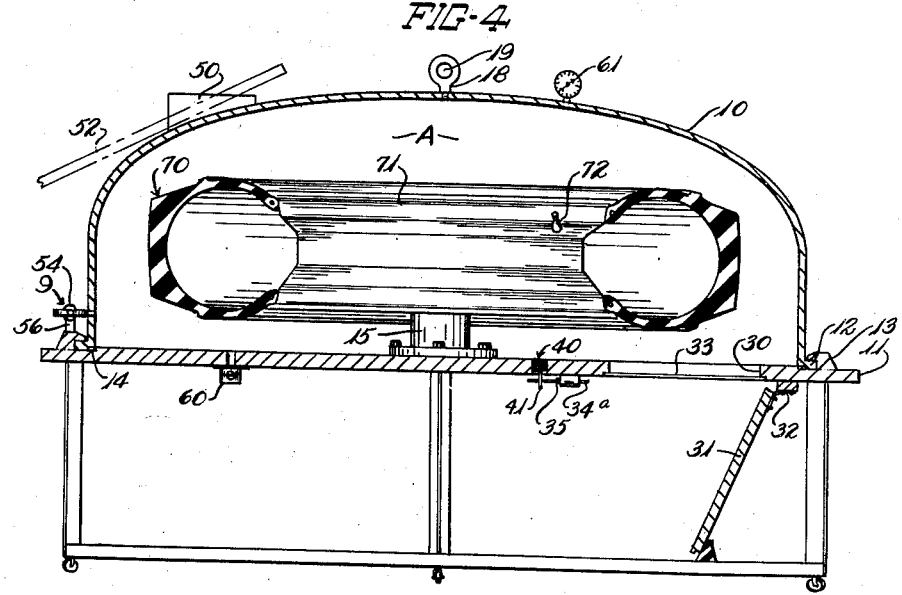
INVENTOR.
GEORGE P. BOSOMWORTH
BY
W. A. Fraser
ATTY-

United States Patent Office 2,849,059
Patented Aug. 26, 1958

2,849,059

BEAD SEATING AND INFLATING DEVICE FOR TUBELESS TIRE

George P. Bosomworth, Akron, Ohio, assignor to The Firestone Tire & Rubber Company, Akron, Ohio, a corporation of Ohio Application July 21, 1955, Serial No. 523,444

3 Claims. (Cl. 157—1.1)

The present invention relates to apparatus for and the method of seating tire beads during the mounting of tubeless tires on their rims.

As tubeless tires have come into general use, the mounting of these tires have presented the industry with a problem. One expedient that has proven successful and is presently in commercial use is the providing of means to create a differential air pressure between the inside and the outside of the tire when the tire is on its rim and the beads unseated whereby the sides of the tire are spread apart and the beads are forced upon their rim bead seats. These expedients, so far as applicant knows, have all involved apparatus that was complicated and it is an object of the present invention to provide simple means and method for mounting tubeless tires said means comprising apparatus that is inexpensive, substantially foolproof in operation and makes possible the mounting of a tire on its rim with a minimum of manual labor and time.

Other objects and advantages of the invention will be apparent to those familiar with the art as the description proceeds.

Referring to the drawings, Fig. 1 is a top plan view of the apparatus embodying the present invention including a cover, its support and locking means for locking the cover to the support and showing the cover in its locked position;

Fig. 2 is a top plan view of a portion of Fig. 1 showing the locking lug members in unlocked position;

Fig. 3 is a sectional view taken along line 3—3 of Fig. 1 showing the tire and rim before the beads are seated on the rim;

Fig. 4 is a view similar to Fig. 3 showing the tire and rim with the tire beads seated on the rim;

Fig. 5 is an enlarged fragmentary sectional view showing the release mechanism for an air escape closure member;

Fig. 6 is an enlarged fragmentary sectional view taken along line 6—6 of Fig. 5; and Fig. 7 is a fragmentary view taken along line 7—7 of Fig. 6.

Referring more specifically to the drawings and particularly to Figs. 1 and 3, it will be seen that the apparatus comprises a dome shaped cover 10 mounted on a flat table-like support 11 with means for locking the cover to its support, said means being in the form of interlocking lugs or ears 12 and 13 formed at the edges of the cover and the support respectively. The support 11 has an annular gasket 14 attached thereto by cementing, or any way found satisfactory, said gasket being so disposed that it is interposed relative to the edges of the cover and the support when the cover is in operative position thereby, with cover 10 and support 11 forming an air-tight chamber A. Means for supporting a tire and rim assembly a sufficient distance above support 11 so that the tire when inflated will not touch it is provided in the form of an upstanding round post 15 as will be seen by reference to Figs. 3 and 4. The post 15 has a reduced end portion adapted to enter the center opening in a disk tire wheel and to provide a shoulder 17 on which the bolt flange of the disk is carried as will also be seen by the reference to the drawing. Cover 10 is provided with inflating means referred to generally as 9 and if desired, the cover may have means in the form of a bolt 18 attached to its top portion, said bolt having an eye 19 through which a chain hook, not shown, may be inserted to provide mechanical means such as pulleys and block for lifting the cover away from its support. Support 11 is provided with a differential pressure valve for sudden discharge of air from an air escape port 30 and its closure member 31 attached to the under side of said support by hinges 32. The closure member, in closed position, seats on a sealing gasket 33, preferably composed of rubber, to provide a substantially air tight chamber A defined by support 11, cover 10 and closure member 31 when the cover is in locked position as shown in Fig. 3. Enclosure member 31 is held in locked position by bolts 34 and 34a carried by bar 35 and are retained in locked position by the force of a compressed coiled spring 38 mounted in a spring housing 36. A washer 37 is attached, as by welding, to rod 34 within housing 36 in slidable relation with the walls of said housing. When the closure member is locked, there is clearance between said washer and the adjacent end of said housing to at least equal the overlap of said bolts on closure 31. As will be seen by reference to Fig. 5 bolt 34 extends through a hole in an end of housing 36 and is supported in slidable relation with the housing therewith in said hole. In locked position shown in Figs. 5 and 6, bolts 34 and 34a are subjected to the unlocking force of compressed spring 38 mounted on rod 34 and are retained in locked position by means of a trigger 41 as will be explained herein later.

A compression valve, referred to generally as 40, communicates with the inside of chamber A through aperture 42 in support 11. Valve 40 comprises the usual cylinder head 43, coiled spring 44 and cylinder rod 45. Valve 40 is disposed relative to support 11 so that rod 45 extends downwardly directly over the end portion 46 of bolt 34. End 46 of bolt 34 is formed with a notch 47 adapted to receive trigger 41 carried on the end of piston rod 45. Trigger 41 is in the form of a loop through which bolt 34 slides and is held in locked spring biased position by the trigger catching in notch 47.

Means for manually turning cover 10 into locked position after it has been lowered upon gasket 14 consists of two spaced lugs 50 and 51 attached to cover 10 and a hand bar 52 removably placed between lugs 50 and 51 providing leverage whereby the cover may manually be firmly turned interlocking ears 12 of the cover with lugs 13 of the support. Ears 12 have a slightly slanting surface so that as they move beneath lugs 13 a surface contact is made that is converted into a downward pressure as cover 10 is rotated pressing the edge of the cover firmly against gasket 14 thereby providing substantially an air tight seal at gasket 14. Cover 10 is provided with inflating means 9 comprising a male member 53 and female member 54 which together form an air-line coupler of the make and break type. The male portion 53 is mounted on the cover and communicates with chamber A through a short pipe 55 and if some lost motion or swivel effect is found to be desirable for male portion 53, then member 55 may be of flexible hose or mounted for swivel action. An upright bar 56 is mounted on support 11 and carries female member 54 of the coupling, the arrangement is such that when cover 10 is dropped into predetermined position on its support and turned into its locking position therewith that the male member enters the female member and opens the line through these members permitting inflationary air to pass into chamber A from an air-line 57 which is connected to the female member 54. The design is such that the coupling is not opened until the locking means 12 and 13 have reached their ultimate locked position. Such air-line couplers as just described are well known and are commercially available and for this reason, it is considered to be unnecessary to describe the coupling structure in detail. Applicant prefers to employ a safety pressure valve 60 of the pop-off type in order to have a strict control over the maximum pressure which may be turned into chamber A. For example, if 60 pounds of pressure is the predetermined pressure in chamber A, the pop-off valve may be set at 65 pounds. If desired, the conventional visual pressure gauge referred to generally as 61 may be attached to the cover and communicate with chamber A.

The steps of mounting a tubeless tire employing the above described apparatus are as follows:

With the cover 10 raised out of contact with its support 11 a substantial distance a tubeless tire 70 to be mounted is placed upon its rim 71 with the tire beads disposed loosely between the rim flanges and the assembled tire and rim is placed on post 15 with the rim bolt ring resting on shoulder 17 of the post. With closure member 31 manually placed in locked position with trigger 41 in notch 47, the cover 10 is lowered into unlocked position, illustrated in Fig. 2, after which bar 52 is inserted between lugs 50 and 51 and the cover manually turned to cause the ears 12 to pass under lugs 13 and interlock. As described above, due to the beveled surface of ears 12 the cover is pressed firmly against gasket 14 and coupling member 53 enters member 54 opening an air connection with air-line 57 whereby the air under pressure passes into chamber A, passage of air continuing until pressure in said chamber is built up sufficiently to compress valve 40 forcing piston rod 45 and trigger 41 downwardly until the trigger is forced out of notch 47 of bolt 34 thus freeing bolt 34 to be actuated by the force of compressed spring 38 which acts to draw bolts 34 and 34a from their locking relation with closure member 31. Withdrawal of bolts 34 and 34a permits member 31 to suddenly swing open permitting the air outside the tire in chamber A to suddenly escape. Since the beads of tire 70 are not in air tight contact with rim 71, the tire will be filled with air at the same pressure as is initially built up in chamber A. The area of port 30 is greater than the area of the opening between the beads of tire 70 and the rim 71 which results in a more rapid escape of air from chamber A outside the tire than air can escape between the said tire beads and said rim with the result that there is suddenly created a greater air pressure against the inside wall of the tire than there is against its outside which results in the tire beads being forcibly pressed upon the rim bead seats trapping air in excess of atmospheric pressure within the tire. Next, by the use of bar 52 the cover is turned to its unlocked position and raised out of the way after which the assembled tire and rim is removed after which another tire and rim assembly may be placed on post 15 and the operation repeated. When the assembled tire rim is removed from the apparatus, the internal pressure of the tire may be checked and air may be permitted to escape or additional air may be turned in the tire through regular rim valve 72.

It will now be seen that after a tire and rim assembly has been placed in chamber A in position on post 15 and the cover 10 locked in position relative to its support that chamber A will be automatically inflated to a predetermined pressure controlled by valve 40 and that when the predetermined pressure has been reached, closure member 31 will automatically be unlocked permitting sudden escape of air from chamber A outside the tire resulting in the automatic seating of the tire beads on the rim tire bead seats.

If found desirable, a manually or automatically operated valve 80 may be disposed in air-line 57 to shut off the flow of air as soon as port 30 is open. If the valve 80 is to be operated automatically, then means for the closure member 31, when it is released from its locked position, to operate a switch in an electric line to actuate mechanism to operate valve 80 may be provided. Since necessary wiring and mechanisms necessary for such mechanical operation of valve 80 is well known, a detailed description of same is not necessary for a complete disclosure of the invention.

While the assembly of cover 10 and support 11 has been described in connection with substantially manual operation, it will be obvious, to those having mechanical skill, that the present invention will admit of many modifications and that the method lends itself to production line operations, such as are presently required by automobile manufacturers, and it is to be understood that such modifications are within the contemplation of the present invention. Accordingly, the detailed description of the patent embodiment of the invention illustrated and described herein is not to be construed as limiting the invention thereto. The invention includes all features of patentable novelty in the foregoing description and the accompanying drawings.

What is claimed is:

1. The method of seating the beads of a tubeless tire in operative position on the bead seats of a one piece drop center rim comprising the steps of initially mounting said tire on said rim with at least one bead portion of said tire not in air tight contact with said rim, placing said tire and rim assembly in a substantially air tight chamber and passing air under pressure into said chamber and tire until an equal predetermined pressure is created in said chamber and tire and then discharging said air from said chamber faster than said air can escape out of said tire.

2. The method of mounting a tubeless tire in operative position on a tire rim which comprises, mounting said tire loosely on said rim, simultaneously subjecting the entire inside and entire outside surface of said tire to equal air pressure above atmospheric and then creating a differential fluid pressure between the inside and outside of the said tire by suddenly lowering the pressure on the outside surface of the tire thereby causing the sides of the tire to be spread apart and the bead portions of the tire to seat upon said rim.

3. Apparatus for mounting a tubeless tire on a tire rim comprising an air tight chamber to receive the said rim with a tire mounted in an uninflated condition thereon and with a portion of a tire bead being spaced from and not seated in operative position on said rim, means for simultaneously building up air pressure in said chamber and tire and means for sudden discharge of air from said chamber, said latter means comprising a differential pressure valve including an escape port and a closure member therefor, a fluid pressure operated trigger by which said closure member is released from its closed position relative to said port, the area of the opening of said port being greater than the space separating the tire beads from the rim.

References Cited in the file of this patent

UNITED STATES PATENTS

| | | |
|---|---|---|
| 711,212 | Honiss | Oct. 14, 1902 |
| 799,922 | Moxham | Sept. 10, 1905 |
| 1,556,981 | Voight | Oct. 13, 1925 |
| 1,770,380 | Young | July 15, 1930 |
| 2,494,541 | Burr et al. | Jan. 17, 1950 |